United States Patent [19]

Flurry et al.

[11] Patent Number: 5,060,149
[45] Date of Patent: Oct. 22, 1991

[54] METHOD FOR CONTROLLING MULTIPLE TERMINALS FROM A SINGLE LOGICALLY PARTITIONED INPUT DEVICE

[75] Inventors: Gregory A. Flurry; Leslie A. Wagner, both of Austin, Tex.

[73] Assignee: International Business Machines Corporation, Armonk, N.Y.

[21] Appl. No.: 409,264

[22] Filed: Sep. 18, 1989

Related U.S. Application Data

[63] Continuation of Ser. No. 820,469, Jan. 17, 1986, abandoned.

[51] Int. Cl.$^5$ .................. G06F 3/147; G06F 3/023; G06F 7/00; G06K 15/18
[52] U.S. Cl. .................. 364/200; 364/228.3; 364/234; 364/234.2; 364/238; 364/286; 364/286.3
[58] Field of Search ... 364/200 MS File, 900 MS File; 340/711, 712

[56] References Cited

U.S. PATENT DOCUMENTS

| | | | |
|---|---|---|---|
| 3,581,289 | 5/1971 | Wilhelm et al. | 364/200 |
| 3,594,762 | 7/1971 | Gardberg | 340/711 |
| 4,064,392 | 12/1977 | Desalu | 364/492 |
| 4,134,149 | 1/1979 | Nord | 364/900 |
| 4,253,145 | 2/1981 | Goldberg | 364/200 |
| 4,279,021 | 7/1981 | See et al. | 364/900 |
| 4,347,565 | 8/1982 | Kaneda et al. | 364/200 |
| 4,366,475 | 12/1982 | Kishi et al. | 340/731 |
| 4,377,852 | 3/1983 | Thompson | 364/900 |
| 4,378,553 | 3/1983 | McCall | 364/200 |
| 4,378,590 | 3/1983 | Kim | 364/200 |
| 4,400,769 | 8/1983 | Kaneda et al. | 364/200 |
| 4,446,514 | 5/1984 | Brown et al. | 364/200 |
| 4,480,304 | 10/1984 | Carr et al. | 364/200 |
| 4,491,907 | 1/1985 | Koeppen et al. | 364/200 |
| 4,517,656 | 5/1985 | Solimeno et al. | 364/900 |
| 4,550,386 | 10/1985 | Hirosawa et al. | 364/900 |
| 4,555,775 | 11/1985 | Pike | 364/900 |
| 4,658,351 | 4/1987 | Teng | 364/200 |
| 4,744,084 | 5/1988 | Beck et al. | 371/23 |

FOREIGN PATENT DOCUMENTS 0114357 12/1983 European Pat. Off. .

OTHER PUBLICATIONS

Texas Instruments TI-99/4A Computer, "user's Reference Guide", written by: The Staff of the Texas Instruments Learning Center, copyright: 1979, 1980, 1981, pp. I5-I7, II5, II6, II17, II87-II90, III3, III4.

"Validity Mask Processing of Keystrokes", *IBM Technical Disclosure Bulletin*, vol. 20, No. 4, Sep. 1977, pp. 1288-1289.

"Alternative Keystroke Functions Using Option Director Mask", *IBM Technical Disclosure Bulletin*, vol. 20, Sep. 1977, pp. 1290-1291.

"Virtual Terminal Management in a Multiple Process Environment", *Proceedings of the 7th Symposium on Operating System Principles*, 1979, pp. 86, 97 ACM, New York, K. A. Lantz et al.

*Primary Examiner*—Thomas C. Lee
*Assistant Examiner*—Robert B. Harrell
*Attorney, Agent, or Firm*—J. H. Barksdale; H. St. Julian; Casimer K. Salys

[57] ABSTRACT

A method of, and system for, using a single keyboard for concurrently interacting with a plurality of terminals. By dividing the keyboard and dedicating one portion to one terminal and another portion to another terminal, a user can have a plurality of applications active at the same time and interact with all.

7 Claims, 3 Drawing Sheets

METHOD FOR CONTROLLING MULTIPLE TERMINALS FROM A SINGLE LOGICALLY PARTITIONED INPUT DEVICE

This is a continuation of application Ser. No. 06/820,469 filed Jan. 17, 1986, now abandoned.

DESCRIPTION

TECHNICAL FIELD

This invention relates generally to interactive terminals, and more specifically to using a single keyboard to control a plurality of applications which are running at the same time.

BACKGROUND OF THE INVENTION

Definitions

For purposes of explanation, the environment of this invention is a device controlled, standalone or host connected workstation or system. Included in the system will be a software operating system. The device for controlling the system can be a standard keyboard having alpha/numeric and cursor motion keys. Also included in the system is a cathode ray tube display device. The display device is used for displaying information loaded into the system, provided by the operating system, and/or input from the keyboard. The capability of handling information to be operated upon, processed, used, etc., will be referred to as a virtual terminal. The system is capable of creating a plurality of virtual terminals. When a virtual terminal is created, it is capable of running an application or other program. When the information is displayed, the virtual terminal becomes a real terminal. As such, each real and virtual terminal is made up of the operating system and any application or other program being used at the time. When a plurality of virtual terminals are included in the system, each will include the operating system and any application or other code being used thereby.

While the system contemplated herein will be capable of handling a plurality of virtual terminals, there will generally only be one display device. In addition, the system will generally have only one keyboard, but may have a plurality of other control devices such as light pens, mice, joy sticks, etc.

When an application or other program has been loaded into the system from a diskette, or by calling from a memory device, and is running in terms of processing data or awaiting input, the terminal with which the application is being used will be referred to as active. When the terminal is active, it is interactive with the keyboard.

Prior Art

A traditional approach to handling a number of different applications is to sequentially load or call each application as needed. This approach has been fraught with problems, primarily because needs change frequently even for a single job. Consider simple document preparation. If a text processing application has been loaded for preparing one portion of the document and the need for table creation arises, a spreadsheet application must be loaded. If memory capacity is sufficient, all needed applications can be loaded at the beginning of operation, but each must still be sequentially called. A purported solution to sequential application calling or loading tasks is a so-called integrated application. In such an application, text processing and spreadsheet applications are combined on the same diskette. Time is saved in terms of diskette loading and unloading, but again, each application must still be sequentially called. Another purported solution is an integrated data stream wherein a common data stream is used for handling text, graphics, tables, etc. Tremendous flexibility and capability are provided with an integrated data stream for sequential or serial type work wherein text is prepared, then a spreadsheet is prepared, then text, and so on. However, each type of job must be specified when needed. For parallel type work though, integrated data streams used with single keyboard and display workstations provide little or no value added. No capability is provided in these data streams for processing text and spreadsheets at the same time. Even if another terminal is added, the integrated data stream itself still does not aid in parallel type work or processing. There is still only one keyboard and it is dedicated to the job at hand. Addition of a keyboard increases workstation costs, and working with two keyboards is cumbersome. Another purported solution lies in the area of windowing. Capabilities exist today to window a plurality of applications at the same time and on the same display screen. Again though, a single keyboard is used and is dedicated to a single window at any given time. In terms of parallel processing, the capabilities of these windowing systems extend no further than those of tradition split screen applications or facilities where, for example, one portion of a document is displayed on the top half of the screen and another portion is displayed on the bottom half. The keyboard is still dedicated to only one portion at a time.

A point to note is that the term parallel processing as used herein is meant to include the parallel running of different applications as opposed to concurrent processing of different portions of the same application.

Also in the prior art is a concept commonly referred to as background processing or background task. An example of background processing is the processing of information for printing while a user is interactively preparing a document in a foreground mode. Here again, the keyboard is dedicated to only one task at a time.

Based on the above, separate handling a plurality of applications with a single keyboard and display is old. Also old is the concept of multiple virtual terminals. Further, keyboard partitioning as a broad concept is old. However, the advance presented by instant invention fails to be either anticipated or rendered obvious by this prior art. This advance is using a single input device to concurrently and interactively control a plurality of terminals. Rendering the input device interactive with a plurality of terminals at the same time is accomplished by partitioning the input device and dedicating one portion to one terminal and another portion to another terminal. The advantage of this advance is that a plurality of applications can be run and receive input at the same time. There is no need to exit one application before entering another.

SUMMARY OF THE INVENTION

A unique system and method are provided for extending the applicability of a single input device to a plurality of active terminals at the same time. This is accomplished by partitioning the input device, and dedicating one portion thereof to one terminal and another portion thereof to another terminal. An example of partitioning when the input device is a keyboard is to dedicate the cursor motion key pad portion of the keyboard to one terminal and the alpha/numeric key pad portion to another terminal. The applicability of the keys can be redefined and a keyboard template provided to a user for key correlation purposes.

DESCRIPTION OF THE PREFERRED EMBODIMENT

Figure 1:
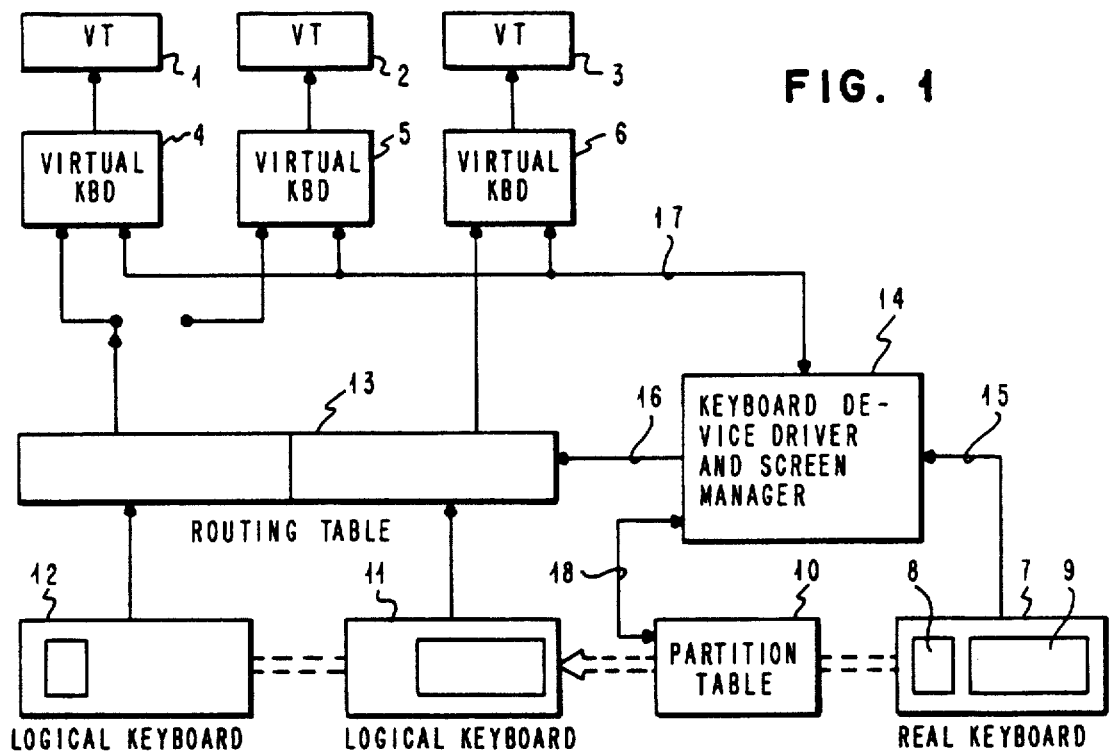
FIG. 1 illustrates in block diagram form a keyboard/display system structured according to this invention.

For a more detailed understanding of this invention, reference is first made to FIG. 1. In a device controlled standalone or host connected computer work station or system, a plurality of virtual terminals 1, 2 and 3 can be created, and any one of the terminals can be real at any one time. It is to be assumed that virtual terminals 1, 2, and 3 are active and running application programs. One may be a text processing application, one may be a draw graphics application, etc. When one of the terminals is real, information will be displayed on the face of the display device included in the system. When the terminals are virtual, information processing can take place, but there will be no visual display of information.

Associated with each of virtual terminals 1, 2 and 3, are virtual keyboards 4, 5, and 6. Virtual keyboards 4, 5, and 6 can effectively become real upon a partitioning of a real keyboard 7 which is the system input device. Any other partitionable input device can be utilized. Keyboard 7 has a cursor motion key pad portion 8 and an alpha/numeric key pad portion 9. Following a partitioning of keyboard 7, keystrokes received from a user are routed to a partition table 10. In actuality, partitioning of keyboard 7 is by a user, an application or the system defining partition table 10. The output of table 10 is to logical keyboards 11 and 12. The outputs from logical keyboards 11 and 12 are routed to a routing table 13. Table 13 is for routing logical keyboards 11 and 12 to any one or all of virtual keyboards 4, 5, and 6. For example, it may be determined that logical keyboard 11 is to be routed to terminal 3 and logical keyboard 12 is to be routed to terminal 1 as shown. Inputs to table 13 for determining routing can be from either keyboard 7 along line 15, through keyboard device driver and screen manager 15, and along line 16, or along lines 17 from the application programs being run on virtual terminals 1, 2 and 3. In like manner, inputs to table 10 for partitioning purposes can be from either keyboard 7, or the application programs being run on terminals 1, 2 and 3 via line 18. In addition, there can be a change in partitioning and routing depending on the state of a particular application or terminal, etc. For example, there may be a change in real terminals with differing key requirements.

In addition, logical partitioning of a real keyboard is not limited to physical groupings such as cursor motion and alpha/numeric key pads. The partitioning may be based on shift states, etc.

Figure 2:
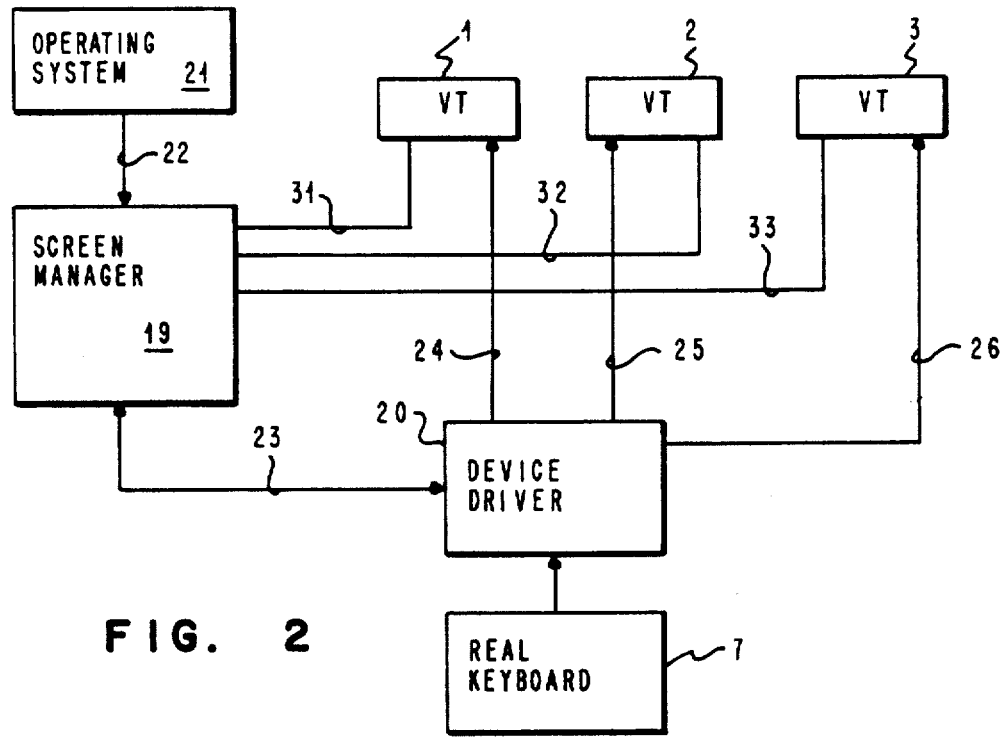
FIG. 2 illustrates in greater detail the relationship of the screen manager and device driver of FIG. 1 to the remainder of the system.

Reference is next made to FIG. 2 which illustrates in greater detail the relationship of keyboard device driver and screen manager block 14 in FIG. 1 to virtual terminals 1, 2, and 3. All virtual terminals must act in the same manner relative to device driver 20, and may thus be considered a single component with multiple instances.

There are two important facets of the instant invention and, in particular, the virtual terminal subsystem of FIG. 2. The first is the routing of input events to virtual terminals. The second is the changing of the routing to make another virtual terminal active.

The real input device 7 may be partitioned by several techniques. For example, the virtual terminal subsystem may permanently partition the device, or operating system 21 can partition the device by communicating with screen manager 19 along line 22. Screen manager 19 in turn communicates the partitioning to device driver 20 along line 23. Each partition is assigned a number to be used as an index into routing table 13 shown in FIG. 1.

Device driver 20 routes input events to virtual terminals 1, 2, and 3 along lines or paths 24, 25, and 26. Device driver 20 uses routing table 13 to determine the virtual terminal that will receive each input event. Routing table 13 contains an entry for each logical partition of real input device 7. The entry contains an identifier for the path from device driver 20 to the virtual terminal that should receive events from logical device 12 or 13 in FIG. 1. The identifier is for paths 24, 25, and 26.

Figure 3:
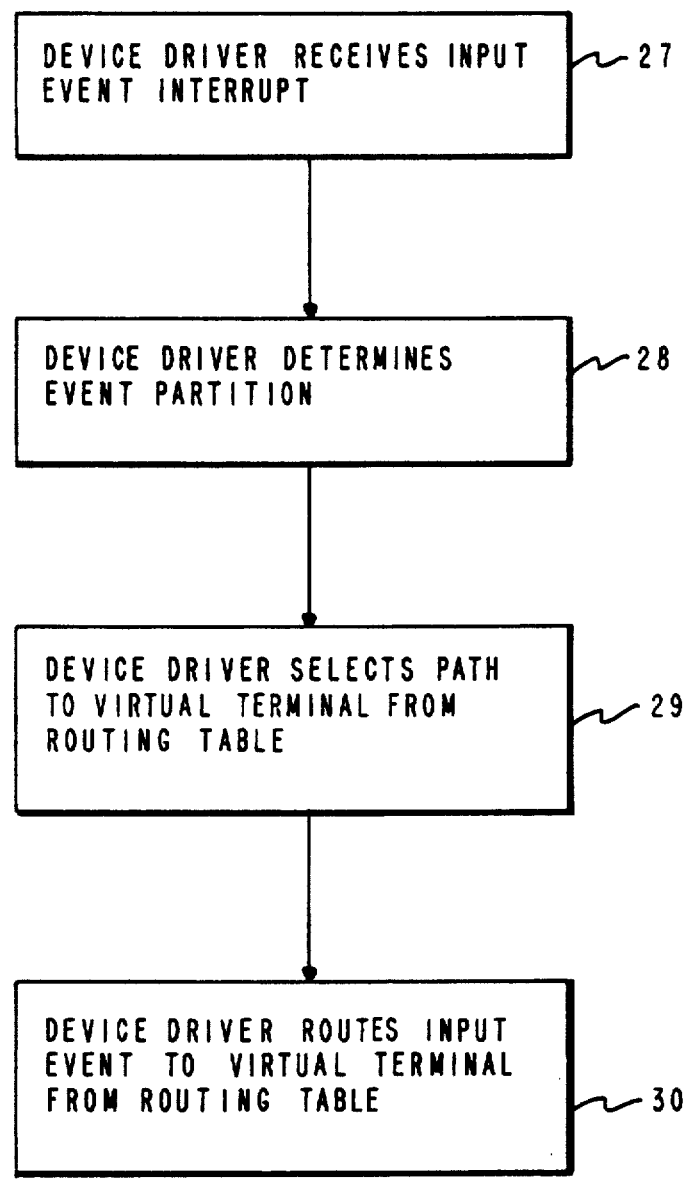
FIG. 3 is a flow chart illustrating event routing.

Reference is next made to the flow chart of FIG. 3 which illustrates input routing for causing a single keyboard to be interactive with a plurality of active terminals.

A normal input event in its flow through the system from real device 7 is received by device driver 20 as indicated by block 27. The device driver determines the logical partition to which the input event belongs using a method appropriate to a partitioning strategy. This is indicated by block 28. This results in a partition number. The device driver derives the path along which to send the input event by using the partition number as an index into the routing table. This is indicated by block 29. The device driver sends the input event along the path derived from the routing table, and then to the correct virtual terminal. This is indicated by block 30.

In the above there is a single path between the device driver 20 and one of virtual terminals 1, 2, and 3 for all logical devices required by the virtual terminal. This permits the device driver to route different logical devices to different virtual terminals, in order for multiple virtual terminals to receive input events.

For a change in routing, a virtual terminal may specify which partition of a physical device it desires to use. This can be accomplished in several ways. One is default assignment. Here, one logical device is always assigned to a particular terminal while other partitions are always assigned to the active virtual terminal. Other ways include default assignment by class of virtual terminal, and providing an interface, using paths 31, 32, and 33 in FIG. 2. Using an interface allows a virtual terminal to specify exactly which logical devices it requires. The screen manager 19 must record the virtual terminal needs and communicate that information to device driver 20 along path 23 at the time a virtual terminal is to be made active.

A variety of methods exist for deciding which virtual terminal receives input from a partition of a logical device. For example, the simplest method is to determine that the last virtual terminal requesting a logical device when active will receive input until another virtual terminal requesting that logical device becomes active. A more sophisticated method is to allow the operating system along path 22 or a virtual terminal along paths 31, 32, and 33 to assign a priority according to the virtual terminals needs. The logical device is always assigned to the virtual terminal that has the highest priority assigned to the device. A variation is to route events from the logical device to the active virtual terminal and to the virtual terminal with the highest priority if the active one has not requested the device.

The request precipitating the change in input routing may come from the partitioned input driver 20 along path 23, or from the operating system, along path 22. In any event, the result is the same.

Figure 4:
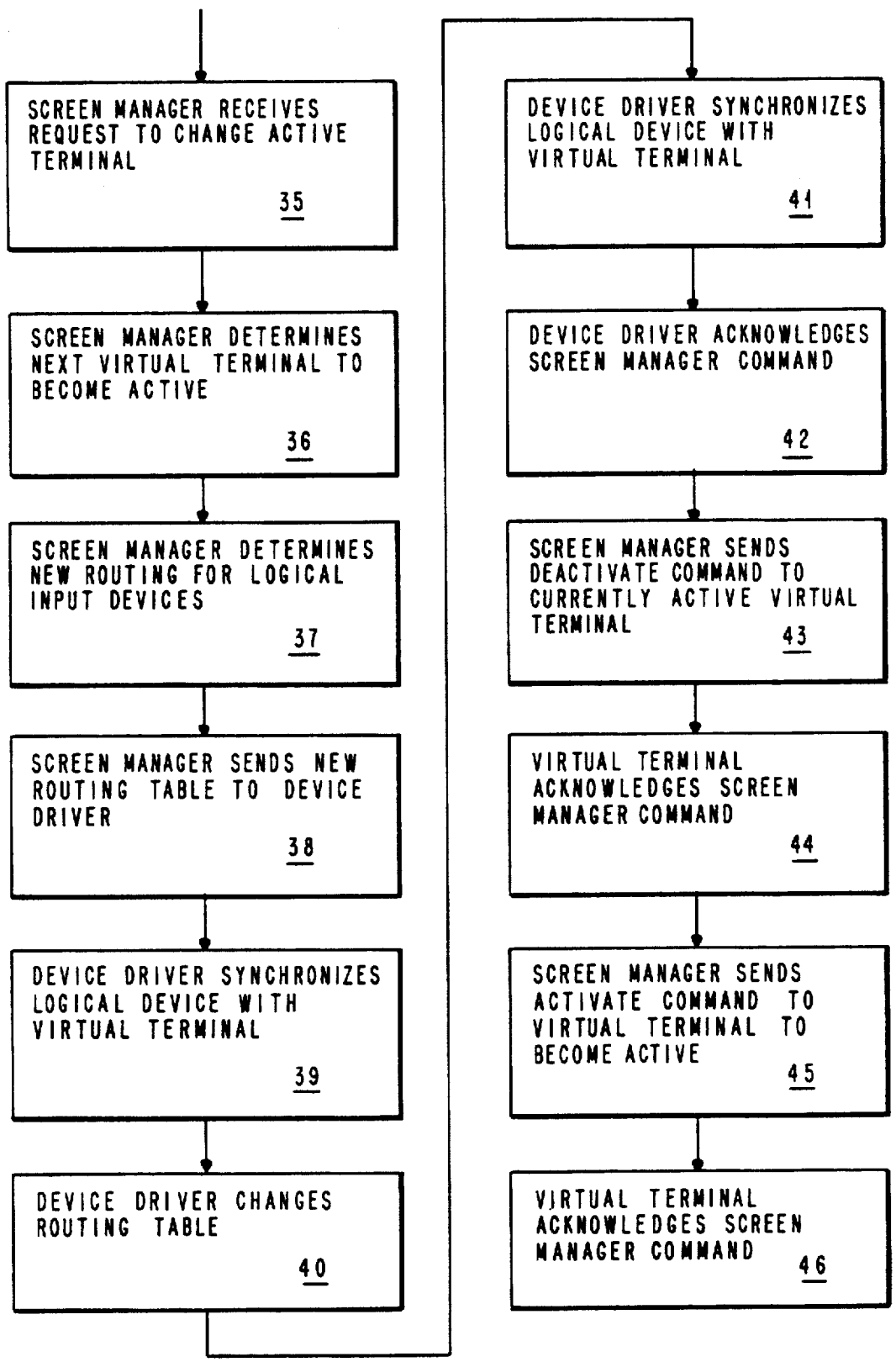
FIG. 4 is a flow chart illustrating a changing of the routing.

Refer next to FIG. 4. Screen manager 19 receives a change request as indicated by block 35, and determines the virtual terminal that is to become active, based on subsystem rules for screen management and the form of the request, as indicated by block 36. Screen manager 19 next determines the new routing for all partitions of all partitioned input devices as indicated be block 37, based on the virtual terminal that is to become active. There may be more than one partitioned device in the subsystem and all must switch when another virtual terminal becomes active. Screen manager 19 then sends the new routing information to device driver 20, as indicated by block 38. Device driver 20 ensures that the logical device is synchronized for the virtual terminal becoming inactive, as indicated by block 39. This requires that device driver 20 maintain state information for a logical device that may have modes such as "shift". Device driver 20 then changes its routing table to reflect the new routing determined by screen manager 19 as indicated by block 40. Device driver 20 next ensures that the logical device is synchronized for the virtual terminal becoming active. This is indicated by block 41. Thereafter, device driver 20 acknowledges the screen manager command via path 23 as indicated by block 42. Screen manager 19 then sends a deactivate command to the virtual terminal becoming inactive as indicted by block 43. The virtual terminal itself initiates any activities needed to become inactive. The virtual terminal then acknowledges the screen manager command via one of paths 31, 32, and 33 as indicated by block 44. Next, screen manager 19 sends an activate command to the virtual terminal becoming active as indicated by block 45. The virtual terminal becoming active initiates any activities needed to become active. The virtual terminal then acknowledges the screen manager command via one of paths 31, 32, and 33, as indicated by block 46.

Set out below are illustrations of routines for partitioning and routing, and causing a single input device to be interactive with a plurality of active applications. These routines are in program design language from which source and object code are derivable.

| ON RECEIPT OF AN INPUT EVENT (E) |
| --- |
| CALL GET_PARTITION (E, P) |
| CALL GET_ROUTE (P, R) |
| CALL SEND_EVENT (R, E) |

The preferred mode for routine GET_PARTITION to determine the correct partition is to use information from the event (E) itself as an index into a partition table 10 that lists the correct partition for each possible event. For a keyboard, the information (E) could be a scan code. Each partition is assigned a number to be used as an index into the routing table 13 as described below. The number of the partition is returned in P.

The routine GET_ROUTE derives the path, or route, on which to send the input event, to a virtual terminal by using the partition number (P) as an index into the routing table 13. Device driver 20 routes input events to virtual terminals 1, 2, and 3 along paths 24, 25, and 26. Device driver 20 uses a routing table 13 to determine the virtual terminals that receive each input event. The routing table contains an entry for each logical partition of real input device 7. The entry contains an identifier for the path from device driver 20 to the virtual terminal that is to receive events from that logical device. The route identifier is then returned in R.

The SEND_EVENT routine sends the input event (E) to the correct virtual terminal along the path identified by R.

The following routines are for changing the input routing. These routines are also in program design language from which source and object code are derivable.

| ON REQUEST TO CHANGE THE INPUT ROUTING |
| --- |
| CALL FIND_VT (VT) |
| FOR ALL PARTITIONED DEVICES |
|     FOR ALL PARTITIONS OF THE REAL DEVICE |
|         CALL FIND_ROUTE (VT, P, PD, R) |
|         PUT R IN NEW ROUTING TABLE (NRT) |
|     ENDFOR |
|     CALL NEW_ROUTES (PD, NRT) |
|     CALL SYNC_VTS (PD, OVT, VT) |
| ENDFOR |
| CALL DEACTIVATE_VT (OVT) |
| CALL ACTIVATE_VT (VT) |

The routine FIND_VT determines the virtual terminal (VT) that is to become active, based on the subsystem rules for screen management and the form of the request.

The routine FIND_ROUTE determines the new routing (R) for a partition (P) of a partitioned input device (PD) based on the virtual terminal that is to become active. A variety of methods exist for deciding which virtual terminal receives input from a partition of a logical device. For example, a simple method is to have the last virtual terminal that requested the logical device when it was active receive input from the logical device until another virtual terminal requesting that logical device becomes active. A more sophisticated method is for the operating system or a virtual terminal to assign a priority according to the virtual terminal's needs. The logical device will always be assigned to the virtual terminal that has the highest priority assigned to the device. A variation of this method is to route events from the logical device to the active virtual terminal and to the virtual terminal with the highest priority if the active one has not requested the device.

The routine NEW_ROUTES sets the new routing (NRT) for the partitioned device (PD). This allows input events from the device to be routed to the proper virtual terminals for the new state of activity.

The routine SYNC_VT ensures that the logical devices (PD) are synchronized for the virtual terminal (OVT) becoming inactive and the virtual terminal (VT) becoming active. This requires that the device driver keep state information for a logical device that may have modes such as "shift".

The routines ACTIVATE_VT and DEACTIVATE_VT allow the virtual terminals becoming active (VT) and inactive (OVT) to perform any functions required.

In summary, a unique system and method are provided for extending the applicability of a single input device to a plurality of active applications at the same time. This is accomplished by partitioning the input device, and dedicating one portion thereof to one application and another portion thereof to another application. An example of partitioning when the input device is a keyboard is to dedicate the cursor motion key pad portion of the keyboard to one application and the alpha/numeric key pad portion to another application.

While the invention has been particularly shown and described with reference to a preferred embodiment, it will be understood by those skilled in the art that various changes in form and detail may be made without departing from the spirit and scope of the invention.

We claim:

1. In a computer system having a user input device and a plurality of virtual terminals, a method of causing said input device to be concurrently interactive with the plurality of virtual terminals, said method comprising the steps of:
  a) selectively partitioning a single user enabled input device into one of a plurality of logically distinct functional segments;
  b) transmitting, subsequent to said step of partitioning, a logically distinct user enabled function from a selected segment of said partitioned input device to the corresponding selected one of said plurality of virtual terminals in said system; and
  c) controlling a distinct application program executing on the selected one of said plurality of virtual terminals using the transmitted logical distinct user enabled function.

2. The method according to claim 1 wherein said input device is a keyboard.

3. The method according to claim 2 wherein said step of partitioning said input device into said plurality of segments further includes the step of partitioning said keyboard such that one set of keys is applicable to one of said terminals and another set of keys is applicable to another of said terminals.

4. The method according to claim 2 where said step of partitioning said input device into said plurality of segments further includes the step of partitioning said keyboard into segments with each segment applicable to a different one of said virtual terminals.

5. The method according to claim 1 further includes the step of transmitting another logically distinct function from said partitioned input device which is assigned to a different one of said segments to another of said terminals whereby said different one of said plurality of segments is distinctly interactive with said another of said terminals.

6. In a computer system, a method of structuring a virtual terminal system such that a single user input device is concurrently interactive with a plurality of virtual terminals, said method comprising the steps of:
  a) selectively partitioning a single user enabled input device into a plurality of logically distinct functional portions; and
  b) assigning one of said logically distinct functional portions to a distinct one of a plurality of virtual terminals and another of said logically distinct functional portions to another of said terminals so that the assigned portion is only interactive with a distinct application program executing on the assigned one of said plurality of virtual terminals.

7. In a computer system having a user input device and a plurality of virtual terminals, a method of causing said input device to be concurrently interactive with said plurality of virtual terminals, said method comprising the steps of:
  assigning user enabled inputs from an input device to one of a plurality of logically distinct functional partitions of said input device;
  storing said input assigned to said plurality of partitions in a partition table in said system;
  assigning each of said partitions to one or more of a plurality of virtual terminals;
  storing said assigned partitions in a routing table in said system; and
  transmitting inputs subsequently entered into said system to a distinct application program executing on one of said virtual terminals in response to entries in said partition table and said routing table.

* * * * *